(12) United States Patent
Halivaara

(10) Patent No.: US 7,161,533 B2
(45) Date of Patent: Jan. 9, 2007

(54) METHOD AND A SYSTEM FOR POSITIONING, AND AN ELECTRONIC DEVICE

(75) Inventor: Ismo Halivaara, Tampere (FI)

(73) Assignee: Nokia Corporation, Espoo (FI)

( * ) Notice: Subject to any disclaimer, the term of this patent is extended or adjusted under 35 U.S.C. 154(b) by 75 days.

(21) Appl. No.: 10/854,739

(22) Filed: May 26, 2004

(65) Prior Publication Data

US 2005/0012661 A1 Jan. 20, 2005

(30) Foreign Application Priority Data

May 26, 2003 (FI) .................. 20035073

(51) Int. Cl.
*G01S 1/00* (2006.01)
(52) U.S. Cl. ............... 342/357.06; 342/357.01
(58) Field of Classification Search ........... 342/357.01, 342/357.02, 357.06, 357.08; 701/207, 213, 701/215

See application file for complete search history.

(56) References Cited

U.S. PATENT DOCUMENTS

2003/0004639 A1   1/2003   Punkka et al.

FOREIGN PATENT DOCUMENTS

WO      WO 02/077661      10/2002

*Primary Examiner*—Dao Phan
(74) *Attorney, Agent, or Firm*—Alfred A. Fressola; Ware, Fressola, Van Der Sluys & Adolphson LLP

(57) ABSTRACT

The present invention relates to a method for determining the position of an electronic device. The electronic device is used for receiving signals from satellites of a positioning system, and in the method, a default position is determined for the electronic device, to be used for positioning. In the method, the time zone is also determined in which the electronic device is located, and at least the determined time zone data is used for determining said default position. Further, the invention relates to a system and an electronic device, in which the method is applied.

21 Claims, 4 Drawing Sheets

METHOD AND A SYSTEM FOR POSITIONING, AND AN ELECTRONIC DEVICE

CROSS-REFERENCE TO RELATED APPLICATIONS

This application claims priority under 35 USC §119 to Finnish Patent Application No. 20035073 filed on May 26, 2003.

BACKGROUND OF THE INVENTION

The present invention relates to a method for positioning an electronic device, in which signals from satellites of a positioning system are received, and a default position is determined for the electronic device, to be used for positioning. The invention also relates to a system for positioning an electronic device, comprising means for receiving signals from satellites of a positioning system, and means for determining a default position for the electronic device, to be used for positioning. Furthermore, the invention relates to an electronic device which comprises a positioning receiver for positioning the electronic device, provided with means for receiving signals from satellites of a positioning system, and means for determining a default position for the electronic device, to be used for positioning.

Devices are known in which a positioning receiver is used for determining the location of the device. Such positioning receivers primarily rest on satellite-based positioning systems. In such positioning systems based on satellites, the positioning receiver attempts to receive a signal transmitted from satellites and containing phase-modulated information, inter alia orbital parameters of the satellites. In practical situations, however, the signal strength in the positioning receiver may be so weak, particularly indoors, that the demodulation of the signal is slow and difficult. Furthermore, the positioning can not necessarily be performed at all times.

One known positioning system is the GPS system (Global Positioning System), which comprises more than 30 satellites, of which usually a maximum of 12 are simultaneously within the sight of a receiver. These satellites transmit e.g. orbital data (Ephemeris data) as well as time data of the satellite. A receiver to be used in positioning normally determines its position by computing the propagation time of a signal transmitted substantially simultaneously from several satellites belonging to the positioning system to the receiver. For positioning, the receiver must typically receive the signals of at least four satellites within sight, to be able to compute the position.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. The carrier of the L1 signal is further modulated by navigation information at a bit rate of 50 bit/s. The navigation information comprises information about the "health" and orbit of the satellite, parameters related to the local clock of the satellite, etc. In satellites of the GPS system, e.g. so-called atomic clocks are used as the local clock.

In assisted positioning (for example, A-GPS, Assisted Global Positioning System), auxiliary information is transmitted to the receiver to accelerate the positioning. Such auxiliary data is, for example, the orbital parameters of the satellites, and the GPS time. On the basis of the auxiliary data, the receiver can faster detect and acquire the signal of a visible satellite; in other words, the time to first fix (TTFF) is reduced. One possibility to implement such a system based on auxiliary data is to use another receiver to receive signals from the satellites, to determine the data transmitted in the signals, and to transmit it to the positioning receiver. The data transmission can be implemented, for example, via a mobile communication network, wherein a receiver of the mobile communication network is arranged in connection with the positioning receiver. In such a system, the positioning receiver and the receiver used for generating auxiliary data may even be relatively far from each other. Furthermore, the validity time of the auxiliary data, i.e. the time during which the auxiliary data is still sufficiently reliable, is relatively long.

Moreover, positioning can be accelerated by determining a default position for the receiver and by transmitting it to the receiver. As the default position, it is possible to use, for example, the position of a base station close to the receiver in the mobile communication network. Consequently, this default location provides a kind of an initial guess for the position of the receiver, which accelerates the determining of the visible satellites, and the time taken for the acquisition of the satellite signals can thus be reduced. A problem in such an arrangement is, however, that it requires the transmission of auxiliary data in a mobile communication network or in another communication network, wherein the auxiliary data is not necessarily available everywhere. Furthermore, the reception of auxiliary data may be subject to a charge, which may reduce the users' interest in utilizing the auxiliary data.

SUMMARY OF THE INVENTION

It is an aim of the present invention to provide an improved method and system for positioning, as well as an electronic device with a positioning receiver applying the method. The invention is based on the idea of determining the time zone in which the positioning receiver is located, and using this time zone for determining a default position. As the time zones are primarily determined along meridians, it is possible to use the time zone data and the time data to determine which satellites should be visible to the positioning receiver, i.e. above the horizon. Thus, the positioning receiver may try to receive the signals of these satellites, and the satellites which are out of sight (below the horizon) can be omitted at this stage. In the method according to an advantageous embodiment of the invention, also a country code or an area code is used to specify the default location in the direction of the latitudes. To put it more precisely, the method according to the present invention is primarily characterized in finding the time zone in which the electronic device is located, and using at least the determined time zone data to determine said default position. The system according to the invention is primarily characterized in that the system also comprises means for determining the time zone in which the electronic device is located, and means for using at least the determined time zone data to determine said default position. The electronic device according to the invention is primarily characterized in that the electronic device also comprises means for determining the time zone in which the electronic device is located, and means for using at least the determined time zone data to determine said default position.

The present invention shows remarkable advantages over solutions of prior art. When using the method of the invention, the default position of the positioning receiver can be determined at some accuracy without a need to receive auxiliary data subject to a charge, e.g. via a mobile communication network, in the positioning receiver. The invention can be used, irrespective of whether or not the transmission of auxiliary data is available in the mobile communication network or other communication network. By the method according to the invention, positioning can be accelerated when compared to a situation in which auxiliary data is not available or should not be used and there is no other information about the default position of the positioning receiver. The faster positioning also reduces the power consumption of the positioning receiver, because e.g. the maximum search time of Doppler frequencies is reduced by as much as about 80%, and the positioning receiver does not need to attempt to detect the signals of such satellites which are below the horizon. Furthermore, the invention is advantageous in countries with several time zones. In such countries, the mere country code will not tell the time zone in which the positioning receiver is located. In this case, the time zone data can be used together with the country code to determine a default position for the positioning receiver.

DESCRIPTION OF THE DRAWINGS

In the following, the invention will be described in more detail with reference to the appended drawings, in which.

DETAILED DESCRIPTION OF THE INVENTION

Figure 1:
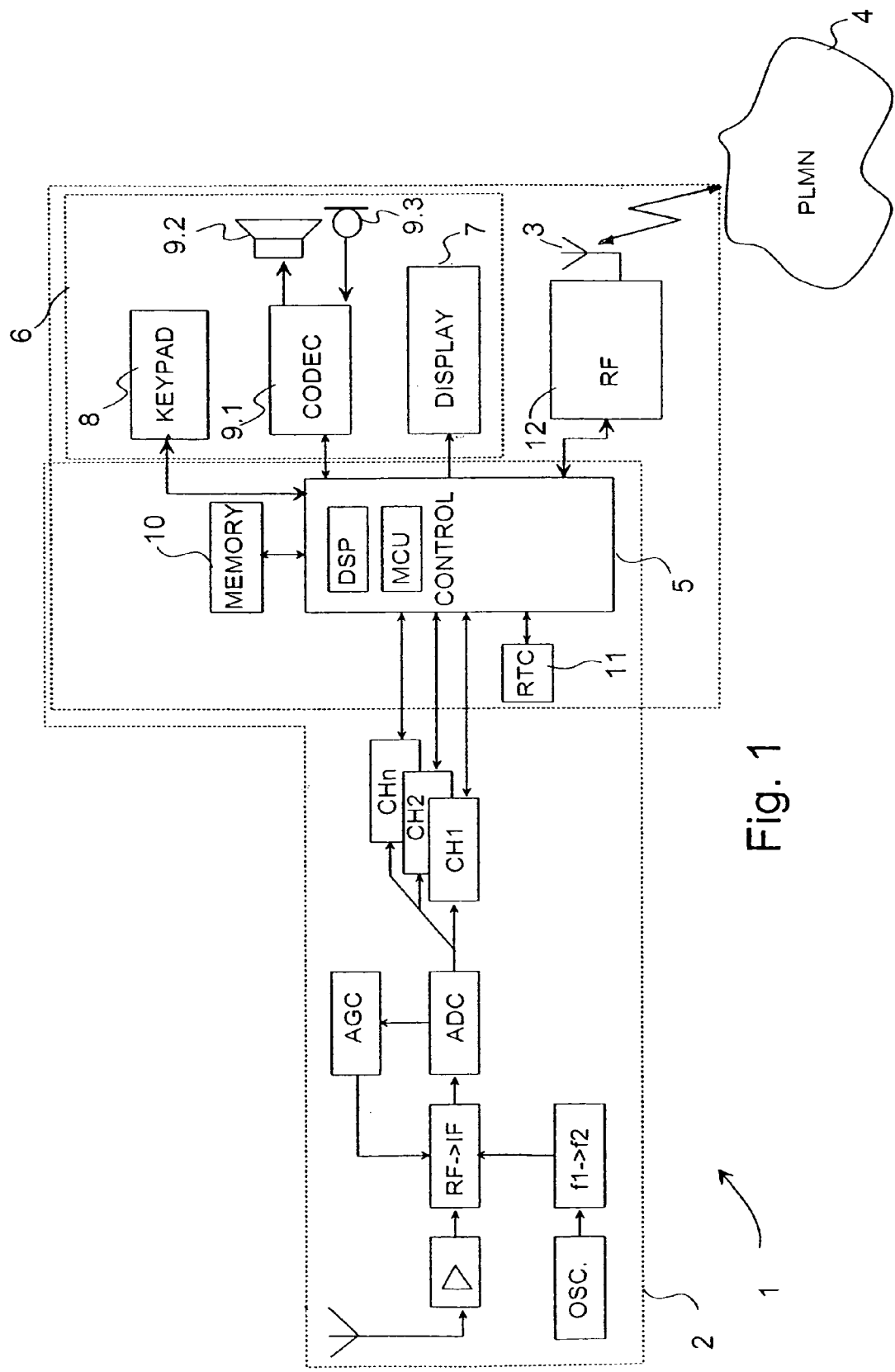
FIG. 1 shows an electronic device according to a preferred embodiment of the invention in a reduced block chart.
Figure 4:
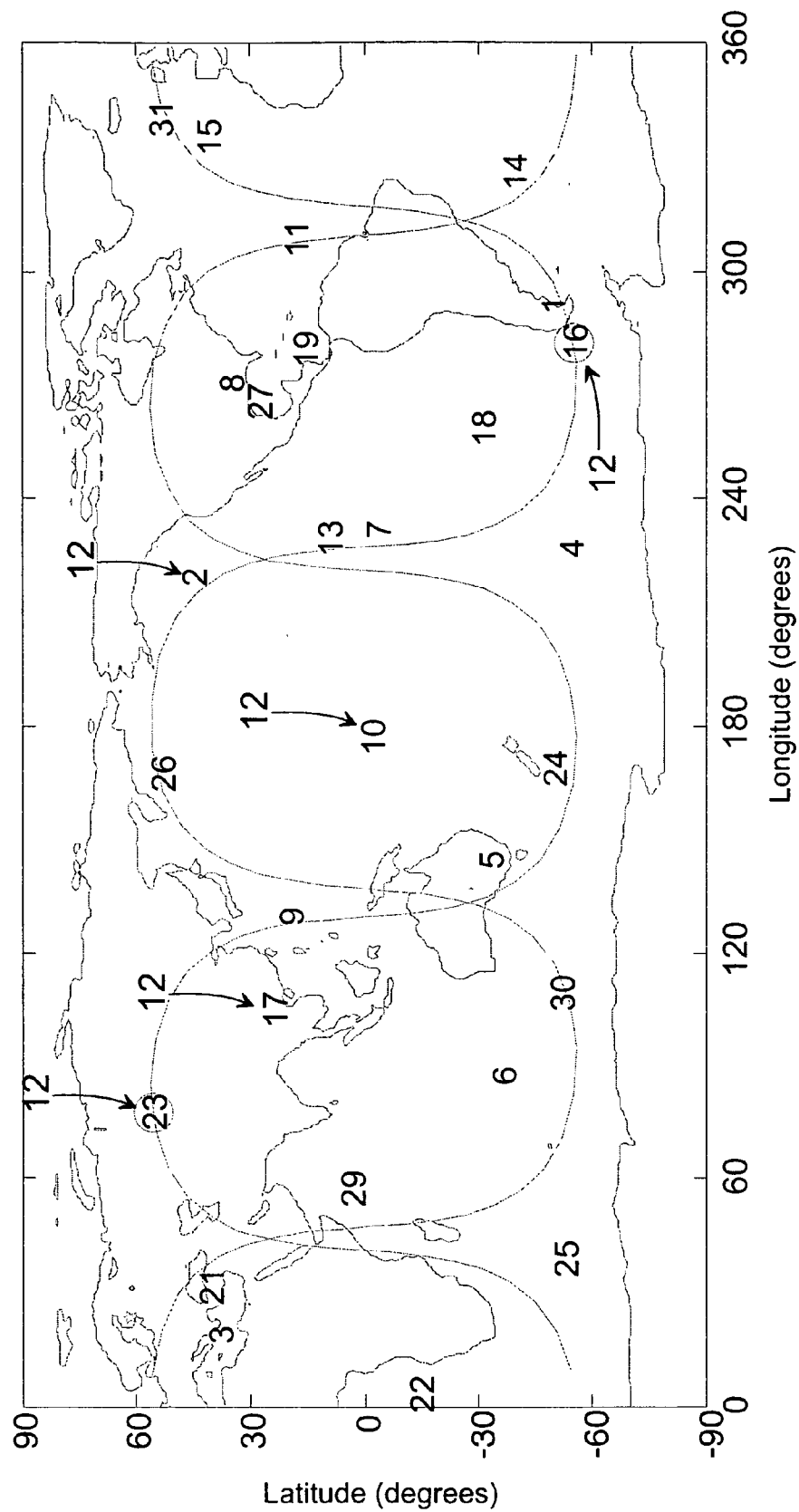
FIG. 4 shows an example of the location of satellites in the GPS system in relation to each other at a moment of time, as well as the orbits of two satellites.

FIG. 1 shows an electronic device 1 according to an advantageous embodiment of the invention. The electronic device 1 comprises, for example, a positioning receiver 2 as well as communication means 3, such as mobile communication means. By these communication means 3, the electronic device 1 may, if necessary, communicate with a communication network 4, such as a public mobile communication network PLMN. Furthermore, the electronic device comprises a control block 5 which preferably comprises a processor MCU and/or a digital signal processor DSP. For the use, the electronic device 1 is provided with at least one user interface 6, preferably comprising a display 7, a keypad 8 and audio means 9.1, 9.2, 9.3. For storing data and application software, the electronic device is provided with memory means 10. The positioning receiver 2 is used for receiving signals of satellites 12 in a positioning system (FIG. 4). The satellites are indicated with the numbers 1, 2, . . . , 11, 13, 14, . . . 19, 21, 22, . . . , 27, 29, 30 or 31, and for the sake of clarity, only some satellites are provided with the reference 12 in FIG. 4.

Figure 2:
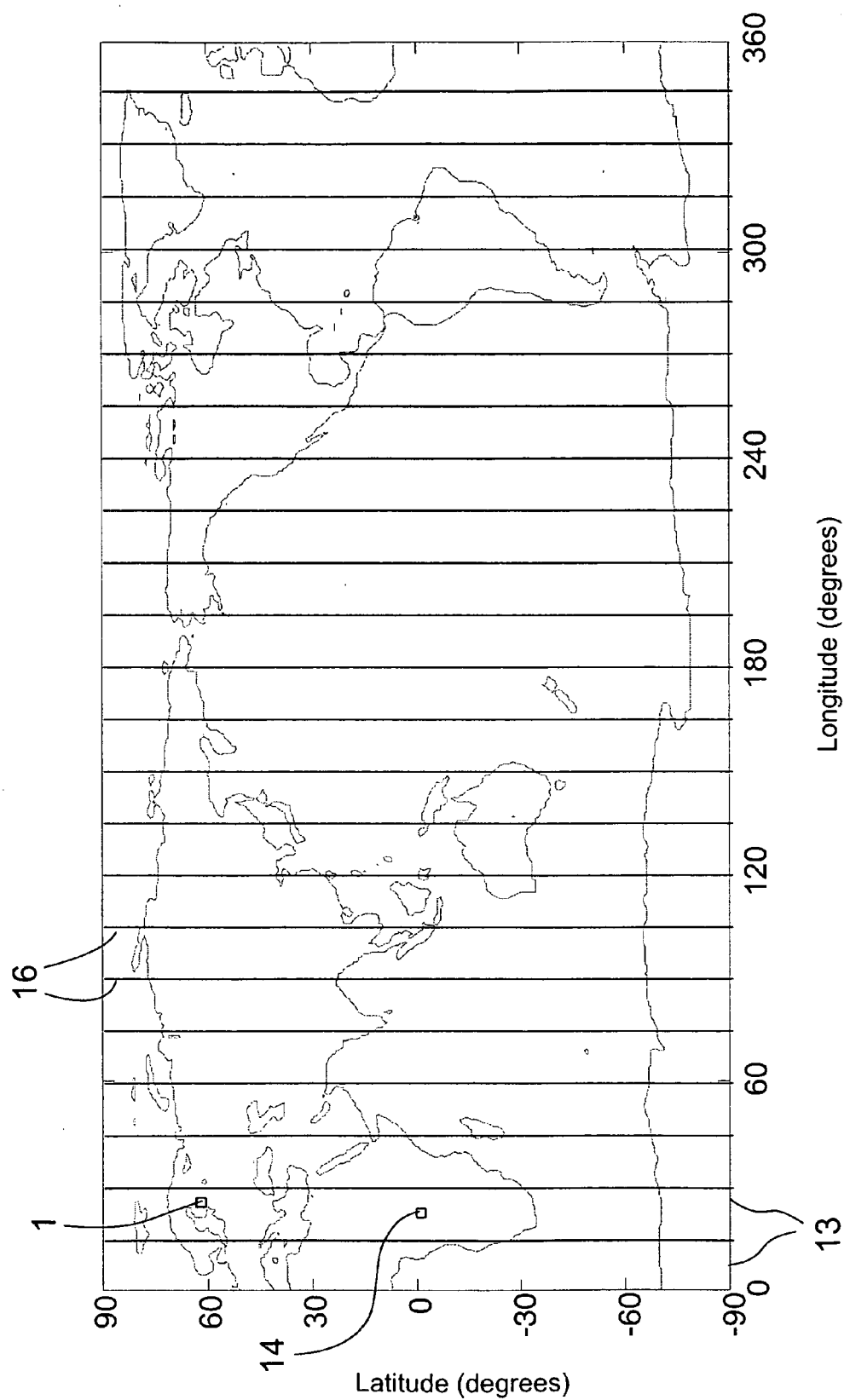
FIG. 2 shows the principle of using a default position based on time zones in the method according to an advantageous embodiment of the invention.

FIG. 2 illustrates, in a reduced manner, the principle of using a default position based on time zones in the method according to an advantageous embodiment of the invention. However, it will be obvious that although the time zones 13 are presented rectilinear and parallel to the meridians in FIGS. 2 and 3, the real time zones, defined on the basis of international agreements, are not rectilinear in all places, but they primarily comply with territorial borders. Moreover, it should be mentioned that in FIGS. 2 and 3, the globe is presented as spread on a plane, wherein the dimensions do not correspond to the real ones. The electronic device 1 is located in a time zone 13 on the earth. The communication means 3 of the electronic device 1 are used to receive information from a communication network 4. This information contains data about the time zone 13 in which the electronic device 1 is located. This data about the time zone is transmitted, for example, in messages (broadcast messages) intended for several mobile stations on the signalling channel of the mobile communication network. Some non-restrictive examples to be mentioned in this context include CDMA System Time data, which is defined in e.g. the IS-95 and IS-2000 mobile communication systems, as well as NITZ (Network Identity and Time Zone), which is defined e.g. in the GSM and WCDMA mobile communication systems. Furthermore, the communication means 3 are preferably used to receive time data, if it is transmitted in the communication network. The time data is normally the international basic time, such as UTC (Universal Time, Co-ordinated). The time zone data, in turn, indicates the difference between the respective time zone and the international basic time. This time difference ranges ±12 hours, except if so-called summer time is used in the time zone, wherein the time difference may range from −11 to +13 hours. Consequently, summer time means that the time has been changed by one hour before the normal time. Also this summer time data is normally transmitted in the communication network either together with the time zone data or as a separate message.

On the basis of the time zone data, it is possible, in the positioning receiver 2 of the electronic device 1, to determine the default position 14 on the earth according to the meridians 16. The time zone data primarily indicates the meridians (longitudes), between which the electronic device 1 is located. However, this data does not indicate the latitude on which the electronic device 1 is located. On the other hand, because the positioning satellites move on a substantially regular orbit round the earth in the width direction and not in the length direction, the time zone data can be used to find out which satellites are above the horizon in this time zone at each time, irrespective of the latitude. The orbits of the satellites are not circular but they are wavelike; that is, the satellites also move, to some extent, with respect to the latitudes (in the direction of the meridians), not only in relation to the meridians (in the direction of the latitudes). However, this is not very significant in view of the present invention, e.g. for the reason that the orbit height of the satellites is relatively great (normally in the order of 17,500 km), wherein the movement of a satellite in the direction of the meridians hardly affects the visibility of the satellite in different locations within the time zone (on different latitudes). FIG. 4 shows a non-restricting example of the orbits of two satellites in the GPS satellite positioning system, as well as the positions of satellites 1–11, 13–19, 21–27, and 29–31 at a moment of time.

In addition to the time zone data, the time must be known at some precision, as well as data about the orbital parameters of the satellites, before the positioning can be made. However, this data is not needed for determining a default position, for which only the time zone data will be sufficient in the method according to the present invention. Consequently, in some cases, the time data can be received from the communication network 4, or a real-time clock 11 or the like, possibly provided in the electronic device 1, may be used. The precision of this real-time clock 11 is not necessarily sufficient for the actual positioning, but the precision is normally sufficient to indicate the time data of the time zone.

When the time zone data, possible summer time data and time data, as well as orbital parameters, are known in the positioning receiver 2, this information can be used to determine which satellites of the positioning system should be above the horizon with respect to the positioning receiver 2. In the positioning receiver 2, some visible satellites are selected which transmit a signal to receive. After this, the searching of the selected satellite signals, and their acquisition, if possible, is started in the positioning receiver 2. It is known that the positioning receiver 2 normally comprises several receiving channels, wherein it is possible to receive the signals of several satellites simultaneously. These satellites to be searched are preferably selected so that their mutual location, or constellation, in relation to the positioning receiver 2 is as advantageous as possible for the positioning.

For example, on the basis of the signal-to-noise ratio, it is examined in the positioning receiver 2 if such a satellite signal can be received whose strength will be sufficient for the demodulation of the navigation data transmitted in the signal. In a situation in which such a sufficiently strong satellite signal can be received in the positioning receiver 2, said navigation data can be determined directly from the satellite signal.

However, it is not always possible to find any satellite signal which would be sufficiently strong for the demodulation of the navigation data. It is thus possible to use, for example, correlation methods, known as such, using known reference data which is correlated (preferably cross-correlated) with the satellite signal to be received. By means of the cross-correlation, an attempt is made to find such a point where the known reference data is present in the signal, and on the basis of this, the acquisition of the satellite signal is performed in the positioning receiver 2, to find out the required data from the navigation data. The cross-correlation result will be better, the longer the reference data that can be used in the cross-correlation.

In some situations, it is possible to use the orbital parameters stored in the memory means 10 of the electronic device 1 as the orbital parameters, the time data of the real time clock (RTC) 11 of the electronic device 1 as the time data, and a predetermined position stored in the memory means 10 of the electronic device 1 as the reference point position data. Thus, the positioning receiver 2 will not need any information from the communication network 4. However, the time data should be correct at a precision of a few seconds; preferably, the maximum error in the time data should be in the order of 3 s. The orbital parameters should be the valid ones, and the reference point position data should not be substantially less correct than the corresponding default position determined on the basis of the time zone.

Normally, the acquisition of at least four different satellite signals by the positioning receiver is needed to determine the three coordinates x, y, z of the position as well as the time data. In the present invention, said position determined on the basis of the time zone is set as the default position 14. To begin with, this default position can be set, for example, around the midpoint of this time zone. Thus, the meridian is preferably selected to be the average of the meridians defining the borders of the time zone. The latitude is selected to be, for example, the equator, if no other data is available. After this, the positioning is started by a method known as such and provided with the facility to use a default position, defined in any way, as a kind of initial guess for the position.

Advantageously, the positioning receiver 2 comprises several receiving channels CH1, CH2, CHn, preferably at least four receiving channels, wherein acquisition of one satellite signal to be searched can be attempted on each receiving channel substantially simultaneously. If there are fewer receiving channels than satellite signals to be tracked, the acquisition of the satellite signals to be tracked is performed at least partly consecutively.

Figure 3:
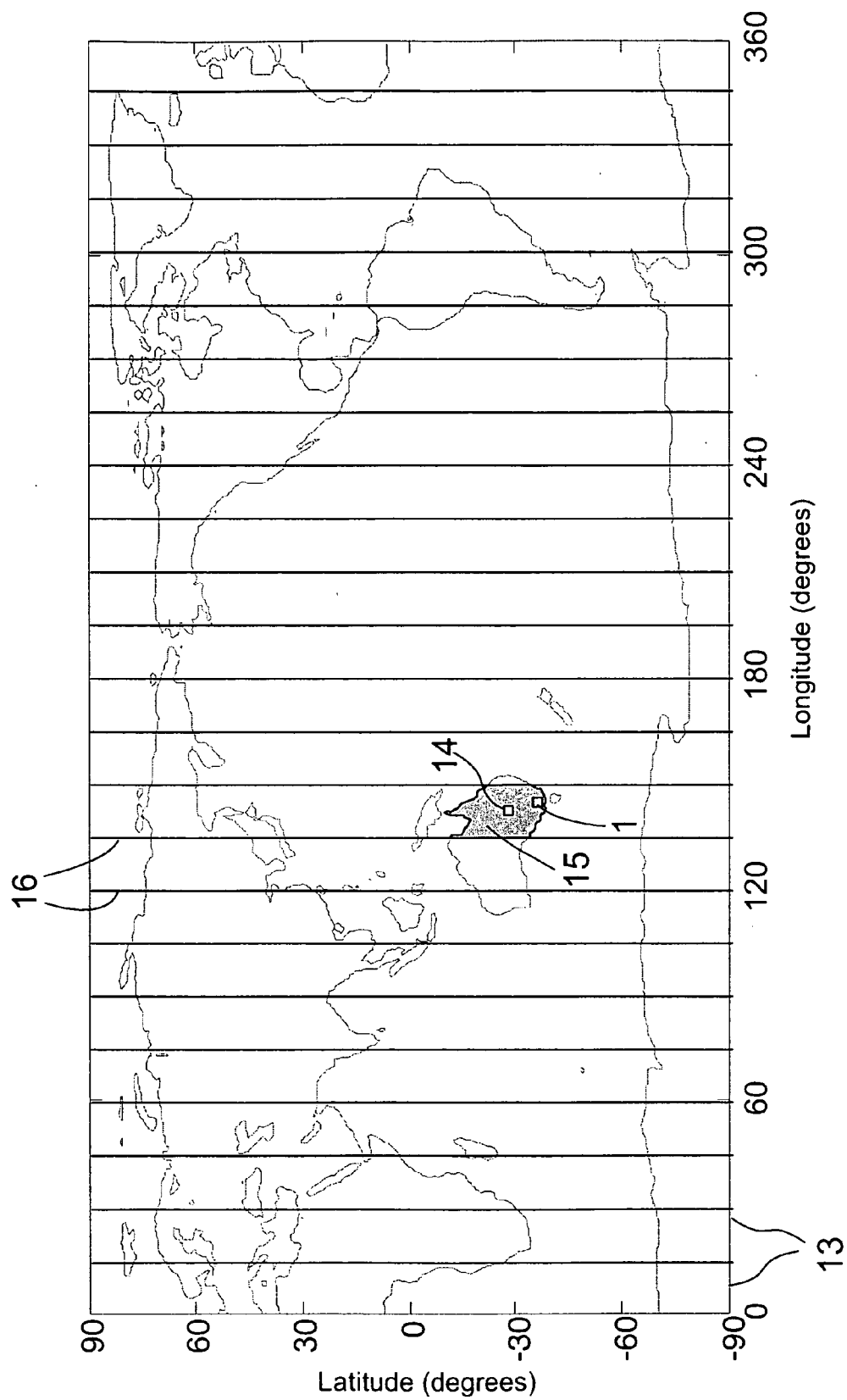
FIG. 3 illustrates the principle of specifying the default position based on time zones by the country code in the method according to another advantageous embodiment of the invention.

In the method according to another advantageous embodiment of the invention, the country code or another area code is used in addition to the time zone data, to restrict the default position 14 to a given area. Thus, particularly in the territories of countries with more than one time zones, it is possible to determine the default position more accurately than by using the country code alone. FIG. 3 shows one example of the principle of improving the accuracy of the default position based on the time zones, with the assistance of the country code. When the country code and the time zone are known, this data can be used to determine a default position 14 which is, for example, around the midpoint of the area defined by the country code and the time zone. This area is shown darker in FIG. 3. After determining the default position 14, it is possible to start positioning by a method known as such, as already stated above in connection with an advantageous embodiment of the invention.

The conversion of the time zone data to the default position can also be implemented by selecting, in advance, default coordinates for each time zone, and by storing them in a memory 10. Thus, these default coordinates are selected as the default position after the time zone data has been determined.

It will be obvious that the present invention is not limited solely to the above-presented embodiments but it can be modified within the scope of the appended claims. Also, for example a system other than the GPS system can be used as the positioning system. Moreover, the communication network 4 used can be other than the GSM or (W)CDMA mobile communication system.

What is claimed is:

1. A method for determining the position of an electronic device, comprising
   receiving signals transmitted by satellites in a positioning system;
   determining a default position for the electronic device, to be used for positioning;
   determining the time zone in which the electronic device is located;
   transmitting data about said time zone from a communication network to the electronic device; and
   using at least the determined time zone data, without any information of the latitude of the location of the electronic device, for determining said default position,
   wherein the method further comprises
   determining time data and orbital parameters of the satellites in the positioning system;
   using the time data, the orbital parameters and the default position to determine which satellites of the positioning system are above the horizon with respect to the electronic device.

2. The method according to claim 1, comprising determining also an area code which indicates the area in which the electronic device is located, and also using said area code for determining said default position.

3. The method according to claim 1, comprising selecting one set of default coordinates for each time zone, and setting the default coordinates selected for the determined time zone as the default position of the electronic device.

4. A system for determining the position of an electronic device, comprising a first receiver configured to receive signals from satellites of a positioning system, a first element configured to determine a default position for the electronic device, to be used for positioning, a second receiver configured to receive data from a communication network;
- a second element configured to determine the time zone in which the electronic device is located;
- a transmitter configured to transmit data about said time zone from the communication network to the electronic device;
- a third element configured to use at least the determined time zone data, without any information of the latitude of the location of the electronic device, and configured to determine said default position;
- a fourth element configured to determine time data; and
- a fifth element configured to use the time data, the orbital parameters and the default position to determine which satellites of the positioning system are above the horizon with respect to the electronic device;
- wherein at least one receiver of the first and the second receivers is configured to receive orbital parameters of satellites in the positioning system.

5. The system according to claim 4, comprising a communication network, that said time zone data is determined in the communication network.

6. The system according to claim 4, wherein an area code is defined in the communication network, to indicate the area in which the electronic device is located, wherein the communication network is adapted to transmit said area code to the electronic device, wherein said area code is arranged to be used in addition to the time zone data for determining said default position.

7. The system according to claim 4, wherein one set of default coordinates has been selected for each time zone, wherein the default coordinates selected for the determined time zone are arranged to be set as the default position of the electronic device.

8. An apparatus comprising:
- a first receiver configured to receive signals from satellites of a positioning system;
- a first element configured to determine a default position for the electronic device, to be used for positioning;
- a second element configured to determine the time zone in which the electronic device is located;
- a third element configured to use at least the determined time zone data, without any information of the latitude of the location of the electronic device, and configured to determine said default position;
- a fourth element configured to determine time data; and
- a fifth element configured to use the time data, the orbital parameters and the default position to determine which satellites of the positioning system are above the horizon with respect to the electronic device;
- wherein said first receiver is configured to receive orbital parameters of satellites in the positioning system.

9. The apparatus according to claim 8, further comprising:
- a second receiver configured to receive time zone data from a communication network.

10. The apparatus according to claim 8, wherein an area code has been defined in the communication network, to indicate the area in which the electronic device is located, and that said area code is arranged to be transmitted from the communication network to the electronic device, wherein said area code is arranged to be used in addition to the time zone data for determining said default position.

11. The apparatus according to claim 9, wherein the communication network is the global system for mobile communication network, wherein the second receiver is configured to receive data from the communication network comprises a global system for mobile communication receiver.

12. The apparatus according to claim 8, wherein the positioning system is the global positioning system, wherein the positioning receiver is a global positioning system receiver.

13. The apparatus according to claim 8, wherein the fourth element is a real time clock of the electronic device.

14. The apparatus according to claim 9, wherein the fourth element comprises the second receiver adapted to receive the time data from the communication network.

15. The apparatus according to claim 8, wherein the second element is a real time clock of the electronic device.

16. The apparatus according to claim 9, wherein the second element comprises the second receiver adapted to receiver the time zone from the communication network.

17. The apparatus according to claim 8, wherein the fifth element is a control block of the electronic device.

18. The system according to claim 4, wherein the first element is a base station of the communication network.

19. The system according to claim 4, wherein the second element is an element of a mobile communication network.

20. An apparatus comprising:
- means for receiving signals from satellites of a positioning system;
- means for determining a default position for the electronic device, to be used for positioning;
- means for determining the time zone in which the electronic device is located;
- means for using at least the determined time zone data, without any information of the latitude of the location of the electonic device, for determining said default position;
- means for determining time data; and
- means for using the time data, the orbital parameters and the default position to determine which satellites of the positioning system are above the horizon with respect to the apparatus;
- wherein said means for receiving are adapted for receiving orbital parameters of satellites in the positioning system.

21. The apparatus according to claim 20, further comprising means for receiving time zone data from a communication network.

* * * * *